United States Patent
Bækkegaard (10) Patent No.: US 11,864,677 B2
(45) Date of Patent: Jan. 9, 2024

(54) INTERLOCKING CARPET TILE

(71) Applicant: Fletco Carpets A/S, Bording (DK)

(72) Inventor: Ole Bækkegaard, Bording (DK)

(73) Assignee: Fletco Carpets A/S, Bording (DK)

( * ) Notice: Subject to any disclaimer, the term of this patent is extended or adjusted under 35 U.S.C. 154(b) by 1056 days.

(21) Appl. No.: 16/623,811

(22) PCT Filed: Jun. 15, 2018

(86) PCT No.: PCT/EP2018/065958
§ 371 (c)(1),
(2) Date: Dec. 18, 2019

(87) PCT Pub. No.: WO2018/234180
PCT Pub. Date: Dec. 27, 2018

(65) Prior Publication Data
US 2020/0121108 A1    Apr. 23, 2020

(30) Foreign Application Priority Data
Jun. 19, 2017    (EP) ..................................... 17176663

(51) Int. Cl.
*A47G 27/02* (2006.01)
*A47G 27/04* (2006.01)
(Continued)

(52) U.S. Cl.
CPC ..... *A47G 27/0293* (2013.01); *A47G 27/0481* (2013.01); *B23K 26/0604* (2013.01);
(Continued)

(58) Field of Classification Search
None
See application file for complete search history.

(56) References Cited

U.S. PATENT DOCUMENTS

| 3,120,083 A | 2/1964 | Dahlberg et al. |
| 3,247,638 A | 4/1966 | Gay, Jr. |

(Continued)

FOREIGN PATENT DOCUMENTS

WO    2004012108 A1    2/2004

OTHER PUBLICATIONS

Extended European Search Report; European Patent Office; European Application No. 17176663.7; dated Dec. 12, 2017; 8 pages.
(Continued)

*Primary Examiner* — Alexander S Thomas
(74) *Attorney, Agent, or Firm* — Taft Stettinius & Hollister LLP (57) ABSTRACT

The invention relates to a flat woven carpet tile (1) with a warp direction and a weft direction. The carpet tile (1) has three or more edges extending along a circumference of the carpet tile. The carpet tile comprises a plurality of indentations (12) and protrusions (13) along all edges. The indentations (12) and protrusions (13) are shaped, dimensioned and located so that the carpet tile (1) is adapted to be joined with abutting identically shaped carpet tiles by mutual interlocking of pairs of mating indentations and protrusions along all the edges in order to form a seamless and coherent carpet. At least some of the protrusions (13) comprise transversely extending gripping elements (14) and the mating indentations (12) comprise corresponding transversely extending notches (15). The gripping elements (14) and notches (15) are dimensioned so that a good interlocking is ensured even if a pulling force is applied in a plane of the carpet tiles in a direction in which the pulling force would otherwise pull the carpet tiles apart. The present invention also relates to a method of manufacturing such a carpet tile, and in particular a method comprising use of laser cutting.

12 Claims, 6 Drawing Sheets a)

(51) Int. Cl.
    *E04F 15/02*     (2006.01)
    *B23K 26/06*     (2014.01)
    *B26D 3/10*     (2006.01)

(52) U.S. Cl.
    CPC ............... *B26D 3/10* (2013.01); *E04F 15/02* (2013.01); *B23K 26/0648* (2013.01); *E04F 2201/095* (2013.01); *Y10T 428/16* (2015.01)

(56) References Cited

U.S. PATENT DOCUMENTS

| | | | |
|---|---|---|---|
| 3,654,051 A | | 4/1972 | Bieler |
| 4,571,353 A | * | 2/1986 | Gable, Jr. ............ D06N 7/0049 52/592.1 |
| 4,942,072 A | * | 7/1990 | Chung ............... A47G 27/0293 428/48 |
| D654,748 S | * | 2/2012 | Lu .................................. D6/582 |
| 2005/0079316 A1 | | 4/2005 | Kobayashi |
| 2008/0069998 A1 | * | 3/2008 | Degn-Hansen ...... D06N 7/0068 428/85 |
| 2008/0072514 A1 | | 3/2008 | Barlow |
| 2009/0031870 A1 | | 2/2009 | O'Connor |
| 2011/0167744 A1 | | 7/2011 | Whispell et al. |
| 2012/0009377 A1 | | 1/2012 | Dodge, III et al. |
| 2014/0109509 A1 | | 4/2014 | Tortorella et al. |
| 2015/0337470 A1 | * | 11/2015 | Evans, Jr. ................ B26B 3/04 428/80 |

OTHER PUBLICATIONS

International Search Report; European Patent Office; International Application No. PCT/EP2018/065958; dated Sep. 13, 2018; 5 pages.
Written Opinion of the International Searching Authority; European Patent Office; International Application No. PCT/EP2018/065958; dated Sep. 13, 2018; 8 pages.
International Preliminary Report on Patentability; European Patent Office; International Application No. PCT/EP2018/065958; dated Dec. 24, 2019; 7 pages.

* cited by examiner

INTERLOCKING CARPET TILE

CROSS-REFERENCE TO RELATED APPLICATIONS

This application is a U.S. National Phase of International PCT Application No. PCT/EP2018/065958 filed on Jun. 15, 2018, which claims priority to European Patent Application No. 17176663.7 filed Jun. 19, 2017, each of which are incorporated herein by reference in their entirety.

FIELD OF THE INVENTION

The present invention relates to carpet tiles, and in particular to flat woven carpet tiles which can be mutually interlocked to obtain a seamless and coherent carpet.

BACKGROUND OF THE INVENTION

Carpet tiles are typically used instead of continuous carpets e.g. in order to facilitate transportation and handling during installation of the carpet. The carpet tiles can be stacked e.g. on pallets and can thus easily be delivered and moved around, including by use of lifts. They are therefore easier to handle resulting in a healthier working environment for the people installing the carpets. Another advantage of using carpet tiles is that it is easy to replace one or more of the carpet tiles in case of wear or dirt. For some applications, the use of carpet tiles are turned to a further advantage by arranging them in a number of patterns, including by using different colours. However, for some applications, some people find continuous carpets more appealing, and attempts have therefore been made to combine the easy transportation known from carpet tiles in general with techniques used to make them look like a coherent surface.

It has been found that even small misalignments of the carpet tiles, including small gaps, result in clearly visible lines of joining and thereby not the desired visual appearance. Therefore, great care must be taken when installing a carpet from carpet tiles. This great care is sometimes compromised by the people installing the carpet, especially when they are working under time pressure. The risk of misalignments and gaps arising is higher, if some of the carpet tiles have not been stored under the prescribed conditions which may result in shrinking and thus formation of small gaps. Such small gaps could also arise if the floor on which the carpet is installed expands due to variations in temperature and moisture.

These disadvantages are particularly pronounced for flat woven carpet tiles, since they have no piles to cover the gaps as would be the case for pile carpets. The reasons why it can be difficult to obtain an appearance of a coherent carpet with flat woven carpet tiles will be further described in relation FIG. 3 below.

Another risk of an undesired result is related to the visual appearance of a flat woven carpet tile being related to the orientation. There is a clearly visible difference between the warp direction and the weft direction. But practical experience shows that if a carpet is made from carpet tiles all arranged with the weft direction of the individual carpet tiles in the same overall direction and with at least one but not all of the carpet tiles oriented 180° in relation to the remaining carpet tiles, the result will be a clearly visible difference between the carpet tiles. Thereby the desired appearance of one coherent carpet is lost. This difference in appearance between carpet tiles arranged 180° with respect to each other can be hard to see from close up, and a possible incorrect laying down of some of the carpet tiles may therefore not be noticed by the person performing the installation. The error may therefore not be realized until later thus probably leading to complaints and need for re-laying of part of the carpet.

Hence, an improved flat woven carpet tile would be advantageous, and in particular a flat woven carpet tile which can be more efficiently and/or reliably used for the installation of a seamless and coherent carpet would be advantageous.

OBJECT OF THE INVENTION

It is an object of the present invention to provide a flat woven carpet tile with which is easier to obtain that a carpet made from a plurality of such carpet tiles looks like a continuous carpet than with known flat woven carpet tiles.

It is another object of the present invention to provide a flat woven carpet tile with which the risk of a plurality of such tiles being arranged as a carpet slide apart or become misaligned during installation and later during use is lower than with known flat woven carpet tiles.

It is an object of at least some embodiments of the present invention to provide a flat woven carpet tile with which a plurality of carpet tiles can still be arranged in the most traditional patterns of arrangement.

It is another object of at least some embodiments of the present invention to provide a flat woven carpet tile with which the risk of loose fibres sticking out is minimized.

It is a further object of the present invention to provide an alternative to the prior art.

In particular, it may be seen as an object of the present invention to provide a flat woven carpet tile that solves the above mentioned problems of the prior art.

SUMMARY OF THE INVENTION

Thus, the above-described object and several other objects are intended to be obtained in a first aspect of the invention by providing a flat woven carpet tile with a warp direction and a weft direction, the carpet tile having:
- an upper surface adapted to face upwards when the carpet tile has been installed on a floor and an opposite lower surface, and
- three or more edges extending along a circumference of the carpet tile, wherein the carpet tile comprises a plurality of indentations and protrusions along all edges, which indentations and protrusions are shaped, dimensioned and located so that the carpet tile is adapted to be joined with abutting identically shaped carpet tiles by mutual interlocking of pairs of mating indentations and protrusions along all the edges in order to form a seamless and coherent carpet, wherein no section is oriented parallel to neither the warp direction nor the weft direction, and
- wherein at least some of the protrusions comprise transversely extending gripping elements and the mating indentations comprise corresponding transversely extending notches, the gripping elements and notches being dimensioned so that a good interlocking is ensured even if a pulling force is applied in a plane of the carpet tiles in a direction in which the pulling force would otherwise pull the carpet tiles apart.

The terms "warp" and "weft" are well-defined within the technical field of weaving in general, and carpet tiles in particular. The warp direction is the direction of the lengthwise warp yarns that are held in tension. The warp is thus the lengthwise or longitudinal thread in the rolls of carpet material being manufactured and from which the carpet tiles are subsequently cut. The weft direction is perpendicular to the warp direction. The weft is a thread or yarn usually made of spun fibres, such as wool or synthetic fibres. However, the present invention is not limited with respect to which kind of material that is used for the yarns.

The pairs of indentations and protrusions which are intended to mate when two adjacent tiles are joined will be referred to a "pairs of mating indentations and protrusions" in relation to one carpet tile in the following even though they are in practise mating with indentations and protrusions, respectively, of a neighbouring carpet tile.

By having the plurality of indentations and protrusions arranged along all edges, it is ensured that a stable interlocking is obtained in both the warp direction and the weft direction. Hereby the risk of undesired misalignment and gaps between adjacent carpet tiles can be avoided in all directions.

By "transversely" is meant a direction transverse to a main direction of a protrusion towards a mating indentation. Thus, the transverse direction will typically be parallel to a width of the carpet tile. This will be clearer from the description of the figures where some examples of shapes of mating protrusions and indentations will be given.

The shape of at least a substantial part of the edges may be composed of a series of coherent sections of straight lines. In presently preferred embodiments of the invention, the edges are composed of such a series of coherent sections of straight lines along the whole periphery as such straight lines have been found easier to cut with the desired precision. However, the scope of protection also covers embodiments wherein the edges are curved, i.e. non-straight, along parts of the circumference of the carpet tile. By ensuring that no section is oriented parallel to neither the warp direction nor the weft direction, a more coherent appearance of a carpet made from such carpet tiles is obtained. This will be explained in further details in relation to the figures.

In presently preferred embodiments of the invention, at least a plurality of the sections of straight lines are arranged at an angle to the warp direction or weft direction, the angle being within the range of 20 to 40°, such as 25 to 35°, preferably around 27°. Experiments performed in relation to the development of the present invention have shown that these angles result in the joints between the carpet tiles being least visible by the human eye under typical indoor lighting conditions.

The shape of at least some of the edges may form a non-periodic pattern of protrusions and indentations within a length of the edge. Hereby it is meant that when looking at one carpet tile only, the shape of the respective edge forms a non-periodic pattern. If two such carpet tiles are arranged next to each other, the pattern formed by to successive edges would form a pattern with a repetition period corresponding to the length of the edge of one carpet tile. Tests made in relation to the development of the present invention have shown that such a non-periodic pattern makes the joining between the carpet tiles even less visible. This is considered an optical effect making it more difficult for the brain of a person looking at the carpet quickly to recognize the vaguely visible joints between the carpet tiles.

In presently preferred embodiments of the invention, for at least some of the pairs of mating indentations and protrusions, the protrusion is slightly larger than the indentation, so that a press fit connection is obtained by the mutual joining of two abutting carpet tiles. Hereby the risk of both misalignment during installation and sliding apart during later use is lowered compared to carpet tiles having the same size of mating indentations and protrusions.

The carpet tile as described above may be shaped so that a plurality of carpet tiles can be arranged in the following patterns: monolithic, ashlar, brick and quarter-turn, and cannot be arranged in a monolithic pattern but with at least one but not all of the carpet tiles turned 180° with respect to an intended orientation. These patterns are well defined within the technical field and will be explained in further details in relation to the figures. Even for flat woven carpet tiles, there will be a visual optical difference between carpet tiles when seen from two orientations 180° with respect to each other. This means that if a plurality of carpet tiles are arranged in a monolithic pattern with most of them arranged in an intended orientation and some them arranged turned 180° with respect to the intended orientation, these latter ones will be clearly visible at least for some colours and materials. To avoid misorientation during installation of carpets made from carpet tiles, prior art tiles are typically provided with arrows on the lower surface, i.e. the surface facing downwards during use. However, even with this precaution being taken, it sometimes happens that carpet tiles are oriented in the wrong direction. With the embodiments of the present invention as just described, this will not happen, and the person installing the carpet does not need to check for arrow orientations on each carpet tile to ensure a correct orientation.

In presently preferred embodiments of the invention, the edges of the carpet tile has been made by laser cutting by use of a laser. With this method, a very high dimensional precision is obtainable, since there is no physical contact between a cutting tool and the carpet tile and thus no pressure is applied to the material during cutting. The precision is typically within a few tenths of a mm. Hereby the risk of misalignment or gaps between the edges of adjacent carpet tiles is low.

This is different from typically used cutting or stamping methods involving the use of a cutting edge of a cutting tool. Such a high precision is particularly important for the above-described embodiments wherein the protrusions are slightly larger than the mating indentations. For such embodiments being made without the necessary precision, there would be a risk of making the protrusions too large to be mated with the indentations or too small to avoid a gap being formed.

Another major advantage of using laser cutting for the manufacturing of carpet tiles from synthetic fibres is that this method results in a slight melting of the fibres along the edges due to the temperature increase caused by the high energy from the laser beam. Thus, laser cutting and this resulting slight melting cause the establishment of a sealed edge without loose fibres extending from the edges. This gives a nicer appearance and it also lowers the risk of misalignment of adjacent carpet tiles due to fibres causing a gap between the carpet tiles.

In embodiments of the invention where the carpet tile is laser cut, it may be cut to have a larger dimension at the upper surface than at the lower surface. Carpet tiles are typically made up of an upper textile layer and at least one backing layer typically made from a stiffer and/or harder material. Thus, by ensuring a larger dimension at the upper surface than at the lower surface, it is obtained that the carpet tiles can be slightly compressed during installation of the carpet due to the less stiff and deformable weaving at the upper surface. Hereby the risk of small gaps between the carpet tiles can be even further minimized.

In a second aspect, the present invention relates to method of manufacturing a flat woven carpet tile as described above, the method comprising:

providing a web of continuous carpet material, and cutting the carpet tile from the web so that the carpet tiles has three or more edges extending along a circumference of the carpet tile, the carpet tile comprising a plurality of indentations and protrusions along all edges, which indentations and protrusions are shaped, dimensioned and located so that the carpet tile is adapted to be joined with abutting identically shaped carpet tiles by mutual interlocking of pairs of mating indentations and protrusions along all the edges in order to form a seamless and coherent carpet, wherein no section is oriented parallel to neither the warp direction nor the weft direction, and wherein at least some of the protrusions comprise transversely extending gripping elements and the mating indentations comprise corresponding transversely extending notches, the gripping elements and notches being dimensioned so that a good interlocking is ensured even if a pulling force is applied in a plane of the carpet tiles in a direction in which the pulling force would otherwise pull the carpet tiles apart.

In some embodiments of the invention, the cutting is performed by laser cutting. In such embodiments, the laser may be provided with a convex lens so that a converging laser beam is obtained, and wherein a distance between the lens and the web to be cut is adjusted so that a focal point is at or near an upper surface of the carpet tile being cut.

The first and second aspects of the present invention may each be combined with any of the other aspects. These and other aspects of the invention will be apparent from and elucidated with reference to the embodiments described hereinafter.

BRIEF DESCRIPTION OF THE FIGURES

The carpet tile according to the invention will now be described in more detail with regard to the accompanying figures. The figures show one way of implementing the present invention and is not to be construed as being limiting to other possible embodiments falling within the scope of the attached claim set.

FIG. 1.*a* is a three-dimensional view, and FIG. 1.*b* is a cross-sectional view through the thickness of the carpet tile in FIG. 1.*a*.

FIG. 2.*a* shows a monolithic pattern; FIG. 2.*b* shows an ashlar pattern; FIG. 2.*c* shows a brick pattern; and FIG. 2.*d* shows a quarter-turn pattern.

FIG. 4.*a* schematically shows an embodiment of a carpet tile according to the present invention. FIG. 4.*b* shows an enlarged view of a part of an edge of the carpet tile in FIG. 4.*a*.

FIGS. 5.*a*-5.*d* show the carpet tiles arranged in the same patterns as in FIGS. 2.*a*-2.*d*. FIG. 5.*e* shows that the carpet tiles cannot be arranged as in a monolithic pattern but with one of the carpet tiles turned 180° with respect to the desired orientation.

DETAILED DESCRIPTION OF AN EMBODIMENT

Figure 1:
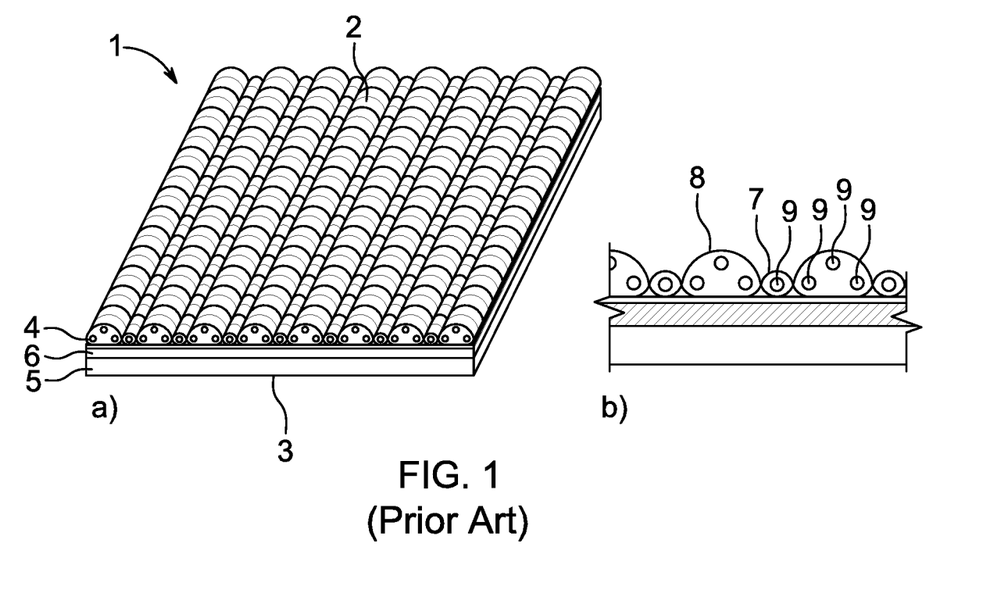
FIG. 1 schematically shows a known flat woven carpet tile.

FIG. 1.*a* schematically shows a prior art quadratic flat woven carpet tile 1. It has an upper surface 2 adapted to face upwards when the carpet tile 1 has been installed and an opposite lower surface 3 facing a floor on which the carpet tile 1 is installed. The illustrated carpet tile 1 comprises an upper layer 4 being the woven textile, a lower layer 5 typically being made from felt, and an optional intermediate layer 6 typically being made from a composite of a binder and a filler. A purpose of the lower layer 5 is to provide sound absorption, and a purpose of the intermediate layer 6 is to add weight to the carpet tile 1 to facilitate the installation and contribute to the carpet tile 1 remaining in the desired position on the floor and in relation to neighbouring carpet tiles. FIG. 1.*b* shows a cross-sectional view of the carpet tile 1 in FIG. 1.*a* illustrating the warp yarn 7 and the pile yarn 8 both running in the warp direction as well as the weft yarn 9 running in the weft direction. In the illustrated embodiment, a plurality of threads, shown as three for illustration, of weft yarn 9 is arranged underneath the pile yarn 8 to provide a thicker carpet and/or to provide a carpet with a desired appearance. The number of threads of weft yarn 9 may differ from what is shown in the figures. There may e.g. be four or five threads of weft yarn 9 under the pile yarn 8 and three threads of weft yarn 9 under the warp yarn 7. There may also be the same number of threads of weft yarn 9 under the pile yarn 8 and warp yarn 7, respectively, such as one thread of weft yarn 9 per loop of each of the warp yarn 7 and pile yarn 8. The actual number of threads to use depends on the desired appearance of the upper surface 2 of the carpet tile 1. A known carpet tile 1 is typically cut to have the edges parallel to the warp and weft directions of the carpet tile 1 as shown schematically by the lines in FIG. 1.*a*.

Figure 2:
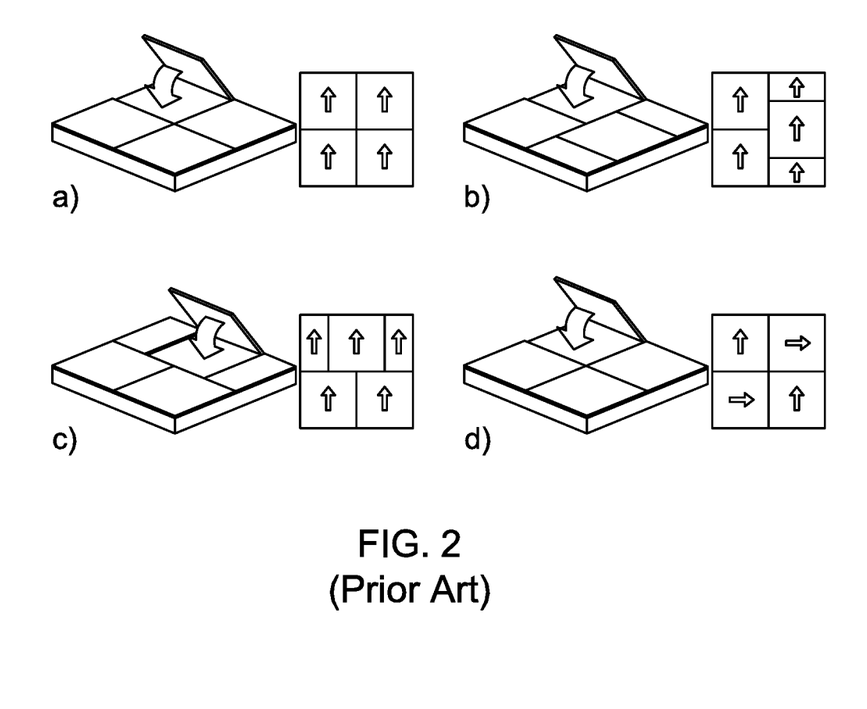
FIG. 2 schematically shows known ways of arranging carpet tiles.

Known carpet tiles 1 are typically arranged in a pattern which makes it clearly visible that the carpet is made from carpet tiles 1. Some typically used patterns are illustrated schematically in FIG. 2. The arrows on the carpet tiles indicate the warp direction. FIG. 2.*a* shows a monolithic pattern in which the carpet tiles are arranged in the same direction and aligned. FIG. 2.*b* shows another arrangement in which the carpet tiles 1 are arranged in the same direction but offset along the warp direction; this pattern is called ashlar. FIG. 2.*c* shows yet another arrangement with the carpet tiles arranged in the same direction but this time offset in the weft direction; this pattern is referred to as brick. Finally, they may be arranged with adjacent carpet tiles being mutually turned 90° as shown in FIG. 2.*d*; this pattern is called quarter-turn. Any of these arrangements will result in a visual appearance of the carpet being made from carpet tiles.

Figure 3:
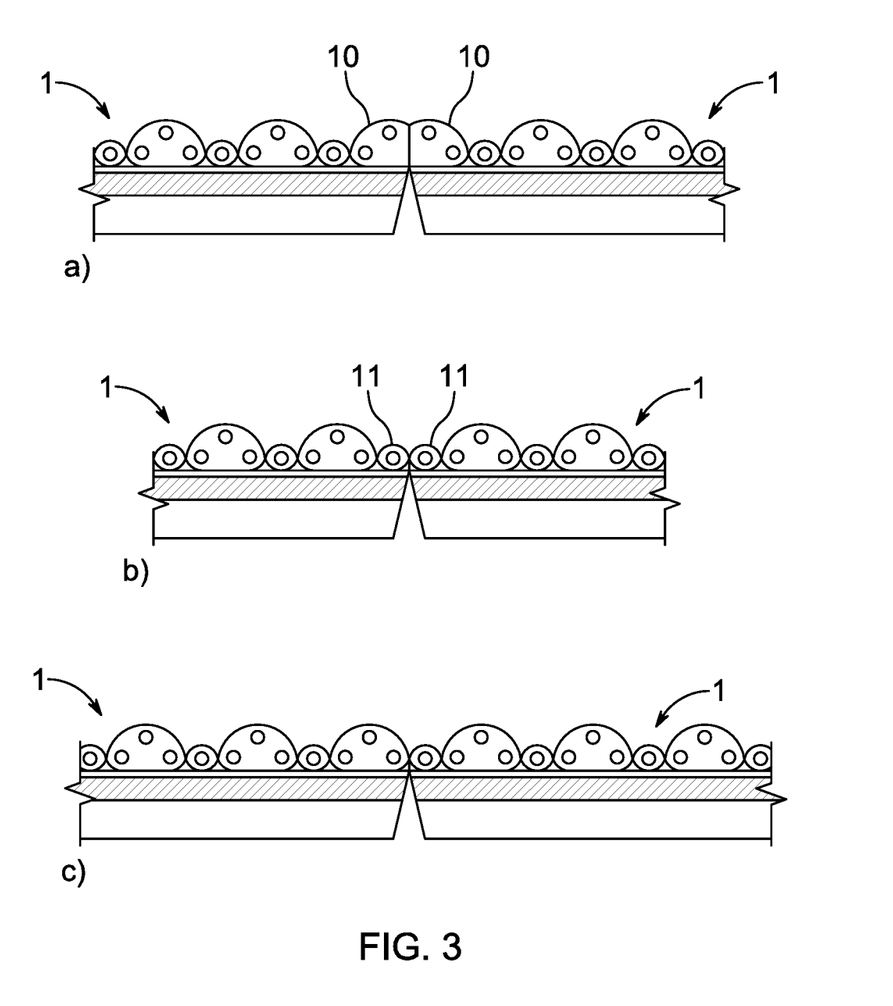
FIG. 3 schematically shows how joining lines parallel to the warp or weft directions can be clearly visible.

As described in details above, it is sometimes desired to make a carpet from carpet tiles 1 but with the appearance as if it was continuous. However, this has proven to be very difficult with the carpets tiles 1 being cut along the warp or weft directions as schematically shown in FIG. 3. FIG. 3.*a* shows a situation in which two tops 10 of the textile weaving meet resulting in the visual appearance as a light line. FIG. 3.*b* shows a situation in which two valleys 11 of the textile weaving meet resulting in the visual appearance as a dark line. FIG. 3.*c* shows a perfect match which is however close to impossible to obtain along the whole edge of a carpet tile 1. A known way of improving the visual appearance of having a carpet made from carpet tiles 1 look like a continuous carpet is to cut the carpet tiles 1 along a zigzag line along two or all of the edges. However, experience shows that even with this shape, the carpet tiles 1 must be very carefully installed to result in a coherent appearance, since even small misalignments will still result in small gaps between the carpet tiles 1 destroying the appearance of a continuous carpet. These problems have been overcome by the present invention.

Figure 4:
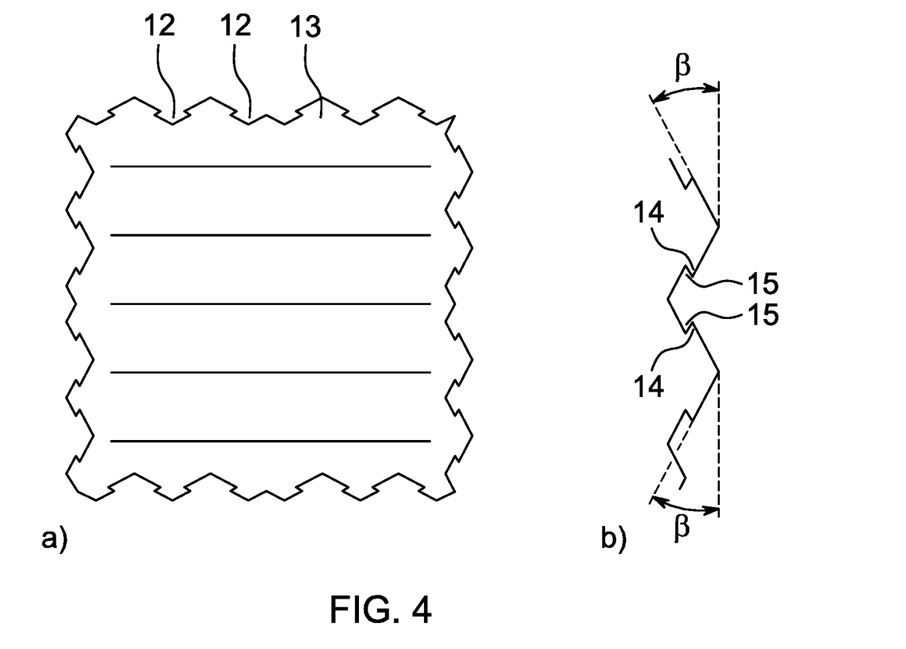

FIG. 4 shows a presently preferred embodiment of the present invention. The carpet tiles being shown in the following figures all have four edges, but the scope of the present invention also covers carpet tiles with three, five or more edges extending along a circumference of the carpet tile. The carpet tile 1 comprises a plurality of indentations 12 and protrusions 13 along all edges. The indentations 12 and protrusions 13 are shaped, dimensioned and located so that the carpet tile 1 is adapted to be joined with abutting identically shaped carpet tiles by mutual interlocking of pairs of mating indentations 12 and protrusions 13 along all the edges in order to form a seamless and coherent carpet; see FIG. 5. As shown in FIG. 4, the shape of the edges is composed of a series of coherent sections of straight lines. No section is oriented parallel to neither the warp direction nor the weft direction, the latter shown with lines on the carpet tiles in the figure, in order to give the visual appearance of a coherent carpet as explained above in relation to FIG. 3.

In presently preferred embodiments of the invention, for at least some of the pairs of mating indentations 12 and protrusions 13, the protrusion 13 is slightly larger than the indentation 12, so that a press fit connection is obtained by a mutual joining of two abutting carpet tiles 1. The exact difference in size of such indentations 12 and protrusions 13 will depend on the properties of an actual carpet tile 1 for a given application. It may e.g. depend on the thickness and the deformability of the carpet tile 1 as well as on the shape of the mating indentations 12 and protrusions 13.

In a presently preferred embodiment, at least a plurality of the sections of straight lines are arranged at an angle β to the warp direction or weft direction, the angle β being within the range of 20 to 40°, such as 25 to 35°, preferably around 27°. The carpet tile 1 shown in FIG. 5 has this preferred angle of 27° for all the sections of straight lines. However, the present invention also covers embodiments with the sections of straight lines arranged at different angles or at other identical angles.

As also shown in FIG. 4.b, which is an enlarged view of part of the carpet tile 1 in FIG. 4.a, some of the protrusions 13 comprise transversely extending gripping elements 14 and the mating indentations 12 comprise corresponding transversely extending notches 15. Hereby a good interlocking is ensured even if a pulling force is applied in a plane of the carpet tiles in a direction which would otherwise result in the carpet tiles being pulled apart. As also shown, the overall shape of the edges forms a non-periodic pattern of protrusions 13 and indentations 12 within a length of the edge. This has been found to improve the visual appearance of a continuous carpet as it makes it harder for the human eye to recognize the joining between two carpet tiles 1.

The exact shape to use for a given overall design of a carpet tile is related to at least the following parameters:
  Cutting length and thereby cutting time.
  Angle in relation to warp and weft directions resulting in the desired appearance. Which angle to use may depend e.g. on the weaving pattern used for the upper layer 4 of the carpet tile 1.
  The size of the transversely extending gripping elements 14 and notches 15. The interlocking edges must be large enough to ensure the needed resistance against being pulling apart. Tests made in relation to the development of the present invention have shown that a good result is obtained by having eight interconnections per 500 mm of overall dimension of the carpet tile edge.

The carpet tile 1 as shown in FIG. 4 has been designed so that a plurality of carpet tiles 1 can be arranged in any of the patterns shown in FIG. 2 and at the same time so that it cannot be arranged in a monolith pattern but with at least one of the carpet tiles 1 turned 180° with respect to an intended orientation. The reason is that at least for some weavings, colours or materials, the visual appearance of the carpet tile is different when seen from two opposite directions. The difference is so small that it is hard to see at a short distance but becomes clearly visible at a larger distance. Therefore, it is difficult for the person laying down the carpet tiles which direction to turn them. Therefore, carpet tiles are typically provided with arrows printed on the backside to ensure a correct laying thereof. However, with carpet tiles according to at least some embodiments of the present invention, they cannot be installed in the wrong orientation due to the shape of the circumferential edge. Therefore, the person laying the carpet tiles does not need to turn each carpet tile to look at the backside, as it will be clear from the shape what to do.

Figure 5:
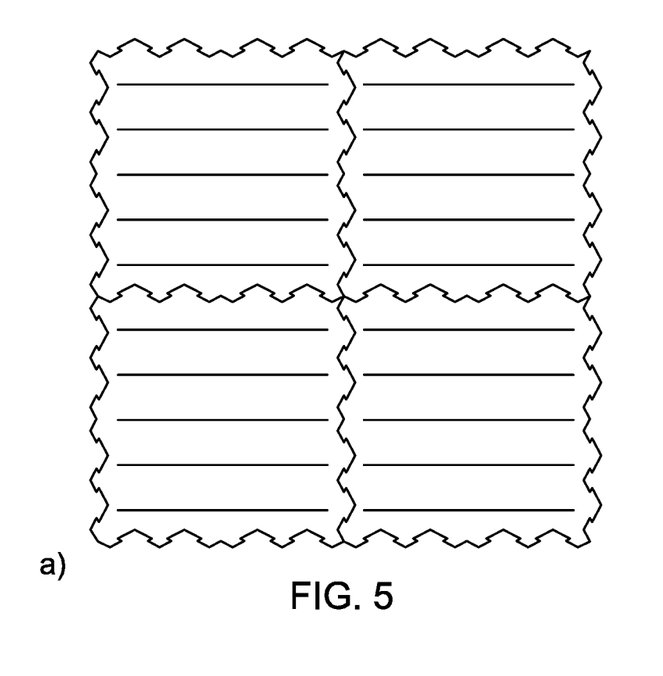
FIG. 5 schematically shows different arrangements of a plurality of carpet tiles shaped as in FIG. 4.

A plurality of carpet tiles 1 as the one shown in FIG. 4 can be arranged in any of the patterns defined in FIG. 2. These arrangements are shown in FIG. 5. FIG. 5.a shows a monolithic pattern; FIG. 5.b shows an ashlar pattern; FIG. 5.c shows a brick pattern; and FIG. 5.d shows a quarter-turn pattern. As shown in FIG. 5.e, the carpet tiles cannot be arranged in a monolithic pattern but with at least one of them turned 180° of the desired orientation.

As should be clearly understandable from the above description, the manufacturing of a carpet tile 1, such as the one shown in FIG. 4, needs a high degree of precision in the cutting of the edges to ensure a good match between the protrusions 13 and indentations 12. Therefore, for a carpet tile 1 according to the present invention the edges are preferably made by laser cutting. This method gives a high degree of precision both due to the control systems available and because no pressure is applied as would be the case if a cutting tool with a blade had been used. This pressure could cause a slight deformation which would be difficult to take into account, as it would depend on the local thickness and pattern.

Figure 6:
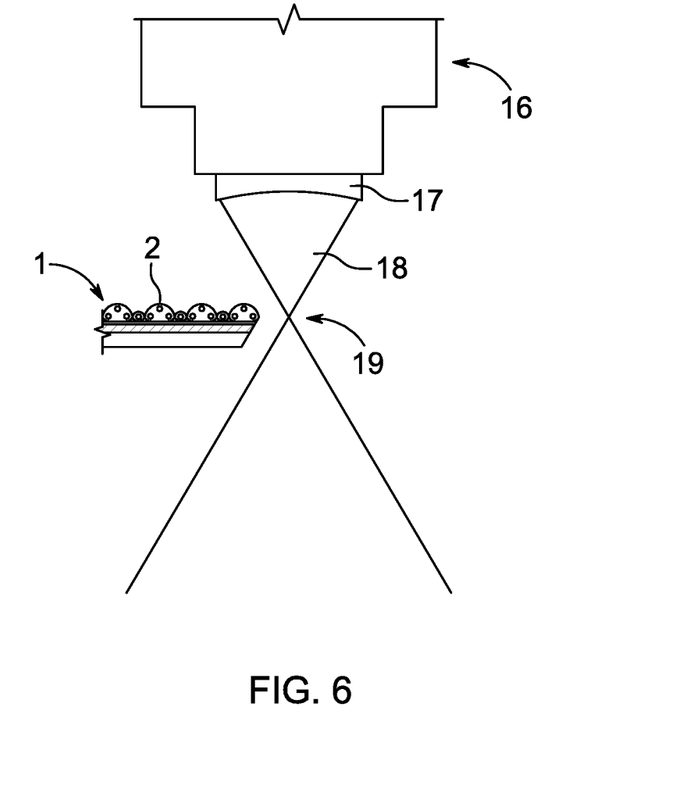
FIG. 6 schematically shows how laser cutting can be used to cut a carpet tile according to the present invention.

A further advantage of using the laser cutting technique is that the carpet tile 1 can be laser cut to have a larger dimension at the upper surface 2 than at the lower surface 3. This would be very difficult or impossible to obtain with other cutting methods. Such a cut can be obtained by the following method, part of which is schematically shown in FIG. 6:
  providing a web of continuous carpet material, and
  cutting the carpet tile from the web so that the carpet tile has a shape as described above,
  wherein the cutting is performed by laser cutting, and
  wherein the laser 16 is provided with a convex lens 17 so that a converging laser beam 18 is obtained, and
  wherein a distance between the lens and the web to be cut is adjusted so that a focal point 19 is at or near an upper surface 2 of the carpet tile 1 being cut. The joining between two carpet tiles is shown in FIG. 3.c from which it can be seen that due to the deformable upper layer 4 of textile, the two carpet tiles 1 can be pressed together so that the risk of a gap between the carpet tiles is minimized.

Still a further advantage of the use of laser cutting is that at least for synthetic fibres, the local temperature rise in the cutting zone results in a slight melting of the material. Thereby a sharp edge without loose fibres is obtained which adds to the coherent appearance of a carpet. The slight melting of the edges also prevents drawing out or loosening of fibres during use of the carpet.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. Flat woven carpet tile with a warp direction and a weft direction, the carpet tile having:
    an upper surface adapted to face upwards when the carpet tile has been installed on a floor and an opposite lower surface, and
    three or more edges extending along a circumference of the carpet tile,
    wherein the carpet tile comprises a plurality of indentations and protrusions along all edges,
    wherein the plurality of indentations and protrusions extend through a thickness of the carpet tile, which indentations and protrusions are shaped, dimensioned and located so that the carpet tile is adapted to be joined with abutting identically shaped carpet tiles by mutual interlocking of pairs of mating indentations and protrusions along all the edges in order to form a seamless and coherent carpet,
    wherein a shape of at least a substantial part of the edges includes a series of sections and no section is oriented parallel to neither the warp direction nor the weft direction, and wherein at least some of the protrusions comprise transversely extending gripping elements and the mating indentations comprise corresponding transversely extending notches, the gripping elements and notches being dimensioned so that a good interlocking is ensured even if a pulling force is applied in a plane of the carpet tiles in a direction in which the pulling force would otherwise pull the carpet tiles apart.

2. Carpet tile according to claim 1, wherein the series of sections include coherent sections of straight lines.

3. Carpet tile according to claim 1, wherein the series of sections include straight lines arranged at an angle ($\beta$) to the warp direction or weft direction, the angle ($\beta$) being within the range of 20 to 40°.

4. Carpet tile according to claim 1, wherein the shape of at least some of the edges forms a non-periodic pattern of protrusions and indentations within a length of the edge.

5. Carpet tile according to claim 1, wherein for at least some of the pairs of mating indentations and protrusions, the protrusion is slightly larger than the indentation, so that a press fit connection is obtained by a mutual joining of two abutting carpet tiles.

6. Carpet tile according to claim 1, wherein the carpet tile is shaped so that a plurality of carpet tiles can be arranged in the following patterns: monolithic, ashlar, brick, and quarter-turn, and cannot be arranged in a monolithic pattern with at least one but not all of the carpet tiles turned 180° with respect to an intended orientation.

7. Carpet tile according to claim 1, wherein the edges of the carpet tile has been made by laser cutting.

8. Carpet tile according to claim 7, wherein the carpet tile has been laser cut to have a larger dimension at the upper surface than at the lower surface.

9. Carpet tile according to claim 1, wherein the series of sections include straight lines arranged at an angle ($\beta$) to the warp direction or weft direction, the angle ($\beta$) being within the range of 25 to 35°.

10. Method of manufacturing a flat woven carpet tile, the method comprising:
    providing a web of continuous flat woven carpet material, and
    cutting the carpet tile from the web so that the carpet tile has three or more edges extending along a circumference of the carpet tile, the carpet tile comprising a plurality of indentations and protrusions along all edges, wherein the plurality of indentations and protrusions extend through a thickness of the carpet tile, which indentations and protrusions are shaped, dimensioned and located so that the carpet tile is adapted to be joined with abutting identically shaped carpet tiles by mutual interlocking of pairs of mating indentations and protrusions along all the edges in order to form a seamless and coherent carpet, wherein a shape of at least a substantial part of the edges includes a series of sections and no section is oriented parallel to neither the warp direction nor the weft direction, and wherein at least some of the protrusions comprise transversely extending gripping elements and the mating indentations comprise corresponding transversely extending notches, the gripping elements and notches being dimensioned so that a good interlocking is ensured even if a pulling force is applied in a plane of the carpet tiles in a direction in which the pulling force would otherwise pull the carpet tiles apart.

11. Method according to claim 10, wherein the cutting is performed by laser cutting by use of a laser.

12. Method according to claim 11, wherein the laser is provided with a convex lens so that a converging laser beam is obtained, and wherein a distance between the lens and the web to be cut is adjusted so that a focal point is at or near an upper surface of the carpet tile being cut.

* * * * *